Nov. 22, 1966  W. A. STUTSKE ETAL  3,287,098
METHOD OF SHEARING CHARGES OF MOLTEN GLASS
Filed Oct. 3, 1962  3 Sheets-Sheet 1

WILLIAM A. STUTSKE & WALTER J. TOEPFER INVENTORS

BY  E. J. Holler
    W. A. Schaich
ATTORNEYS

Nov. 22, 1966   W. A. STUTSKE ETAL   3,287,098
METHOD OF SHEARING CHARGES OF MOLTEN GLASS
Filed Oct. 3, 1962   3 Sheets-Sheet 3
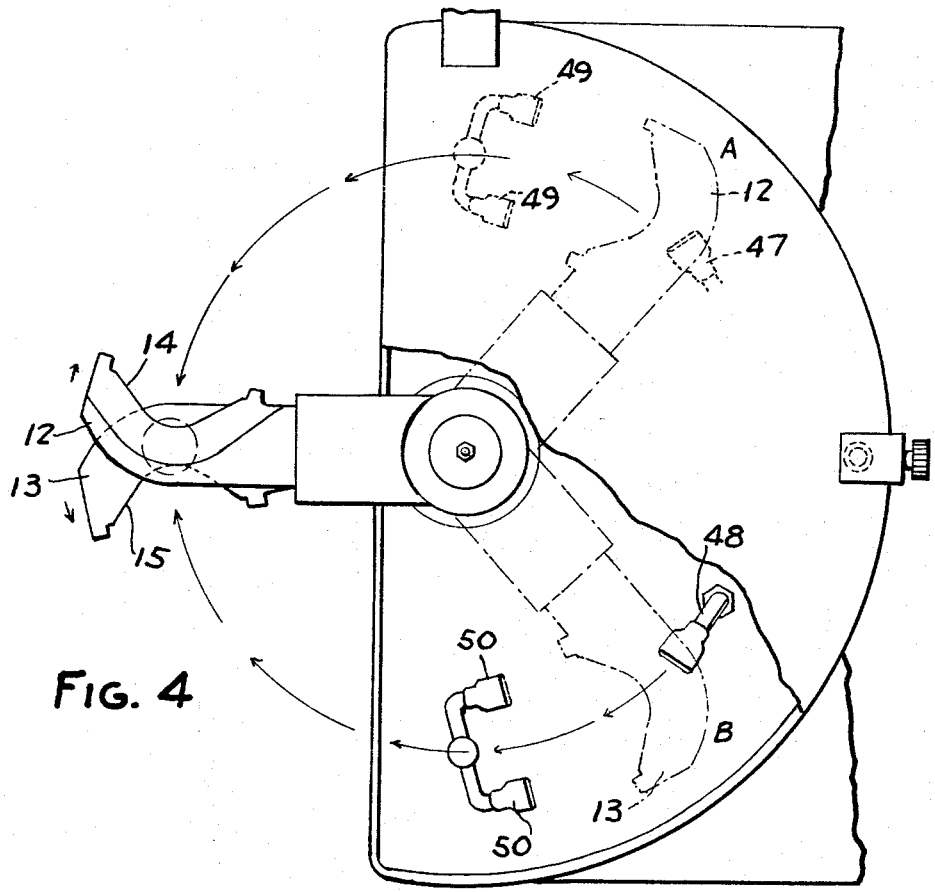
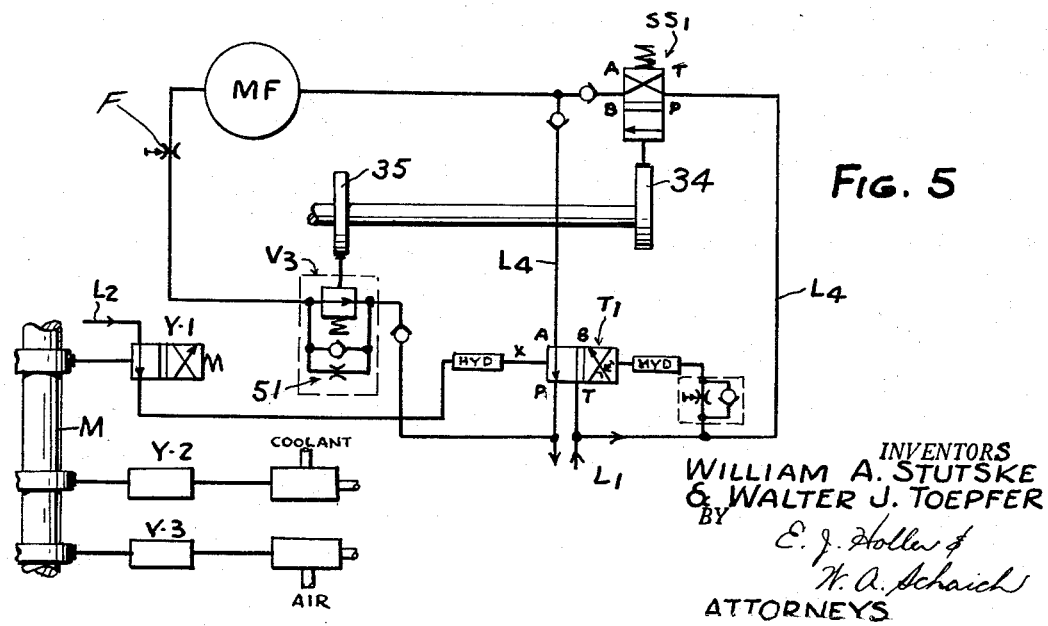
INVENTORS
WILLIAM A. STUTSKE
& WALTER J. TOEPFER
BY
ATTORNEYS 3,287,098
METHOD OF SHEARING CHARGES OF MOLTEN GLASS
William A. Stutske and Walter J. Toepfer, Toledo, Ohio, assignors, by mesne assignments, to Owens-Illinois Inc., a corporation of Ohio
Filed Oct. 3, 1962, Ser. No. 228,044
4 Claims. (Cl. 65—133)

This invention relates to the shearing of charges of glass from a molten stream of glass.

A major factor in making glass articles in high speed glass forming machinery is the ability to successively provide charges of molten glass from a molten stream which are of proper weight, accurately delivered and not deformed.

It is an object of this invention to provide a method and apparatus for shearing successive charges of glass from a molten stream of glass wherein the charges meet these requirements.

It is a further object to provide such a method and apparatus wherein the charges can be sheared at high speed on the order of 60 per minute or more.

It is a further object of the invention to provide such a method and apparatus wherein a better control of weight of the charges is achieved than has been heretofore possible.

It is a further object of the invention to provide such a method and apparatus wherein the charge after severance is always accurately delivered in the same position.

It is a further object of the invention to provide such an apparatus wherein the velocity of the blades can be readily adjusted as desired.

It is a further object of the invention to provide such an apparatus which requires a minimum of maintenance and therefore can be used for longer periods of time without interruption.

Basically, the method comprises rotating shear blades in a closed path which intersects the molten stream, starting the movement of each blade from an initial or rest position and accelerating the blade toward the molten stream, thereafter decelerating the blade before it reaches the molten stream so that the velocity of the blade as it strikes the glass stream is less than the velocity achieved during the acceleration, causing the blades to shear the molten stream at the reduced velocity, thereafter re-accelerating each blade and stopping the blade at its initial position after a single revolution. Further, the blades are preferably sprayed with a liquid coolant at the rest position and a gaseous drying agent is applied on the blades between the rest position and the point of intersection with the glass stream. The apparatus provides a structure for performing the method and includes hydraulically driven means for rotating the shears with cam operated valves for controlling the acceleration, deceleration and stopping of the hydraulic motor, as presently described.

In the drawings:

FIG. 4 is a plan view of the apparatus shown in FIGS. 1 and 3 showing the blades in cutting position.

FIG. 5 is a schematic diagram of the hydraulic, air and liquid coolant circuits.

Figure 1:
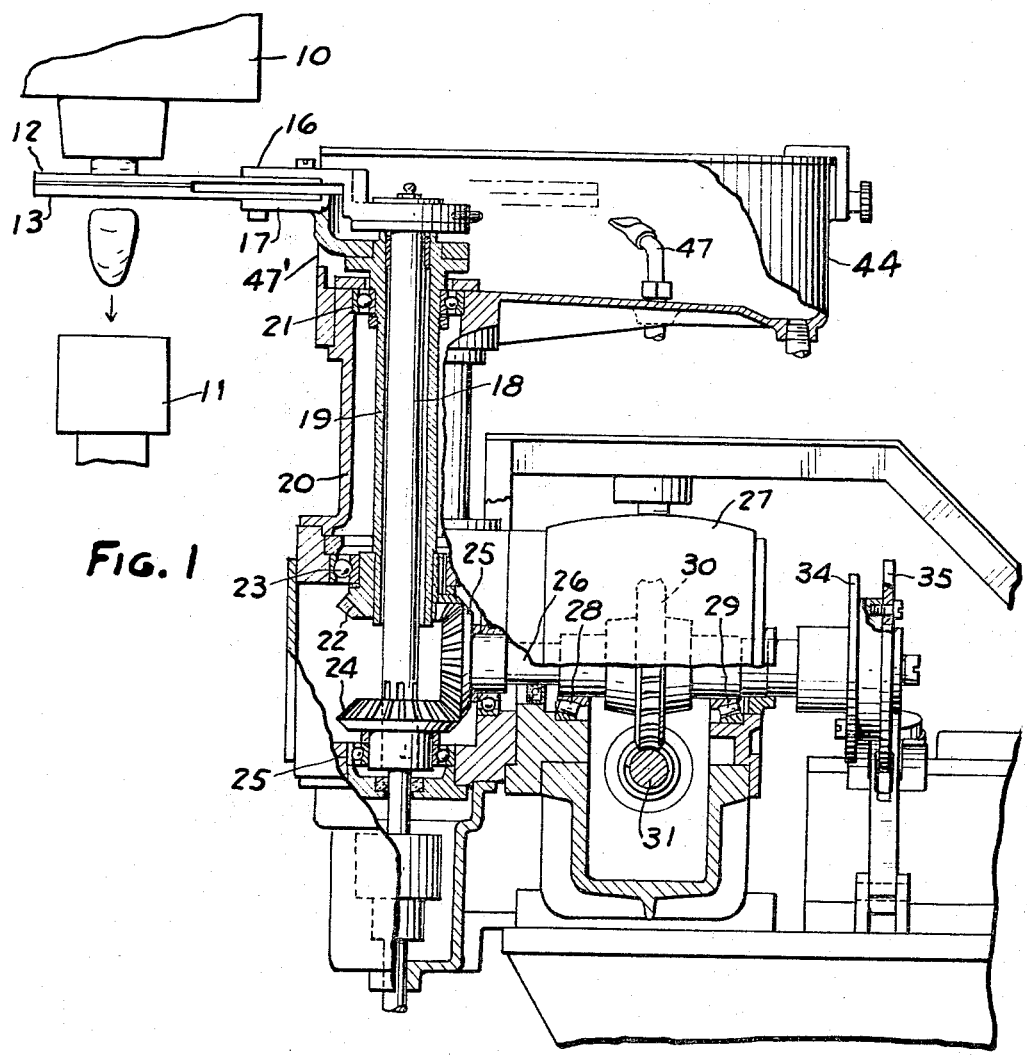
FIG. 1 is a fragmentary part sectional side view of an apparatus embodying the invention.
Figure 3:
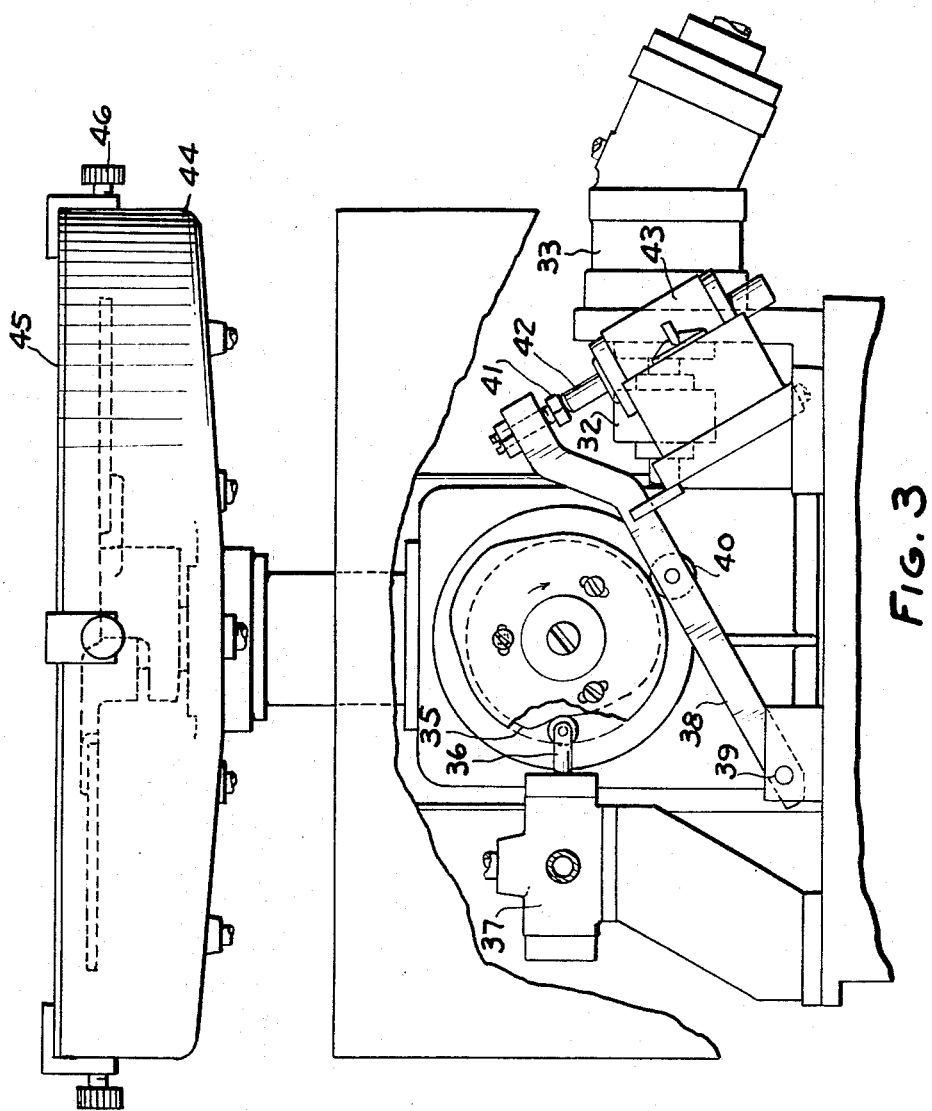
FIG. 3 is a fragmentary end elevation of the apparatus shown in FIG. 1 showing the shear blades in the initial rest position.

Referring to FIGS. 1, 3 and 4, the apparatus embodying the invention is adapted to sever successive charges of molten glass from a stream of molten glass which is fed downwardly from a suitable feeder 10 such as is well known in the art. The successive charges are delivered to suitable apparatus 11 forming part of the glass forming machine which shapes the charges as by pressing or blowing to form glass articles.

Figure 2:
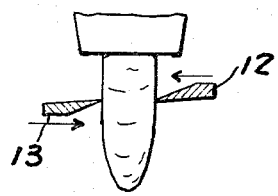
FIG. 2 is a partly diagrammatic view showing the passage of the shear blades through the molten stream of glass.

The apparatus basically comprises a pair of shear blades 12, 13 which are moved in opposite directions in a closed path which intersects the molten stream to shear the charges as shown diagrammatically in FIG. 2. As seen in FIG. 4, the shearing edges 14, 15 are generally V-shaped but may have other configurations as may be desired and is well known in the art.

According to the method, the shear blades are moved from initial or rest positions A, B (FIG. 4) toward the molten stream. During the initial movement, the shear blades are accelerated to move them rapidly toward the molten stream. The shear blades are then decelerated to a lesser velocity so that they pass through the molten stream at a lesser velocity. This prevents an undue lateral movement of the sheared charge. The shear blades thereafter are accelerated rapidly and stopped at their initial positions A and B, respectively.

As shown in FIGS. 1 and 4, shear blades 12, 13 are mounted respectively on arms or supports 16, 17 which, in turn, are mounted on concentric shafts 18, 19. Shaft 19 is tubular and is telescoped over shaft 18. Tubular shaft 19 is journalled in a housing 20 by a ball bearing 21 at its upper end. A bevel gear 22 is fixed to the lower end of the tubular shaft and is journalled in the housing by a ball bearing 23. The shaft 18 projects downwardly below the lower end of the tubular shaft 19 and a second bevel gear 24 is splined thereto and journalled in the housing by a ball bearing 25. Bevel gears 22, 24 are meshed with a bevel gear 25 which is fixed to a shaft 26 journalled in a gear box 27 by roller bearings 28, 29. A worm gear 30 on the shaft 26 meshes with a worm 31 which, in turn, is connected by a coupling 32 (FIG. 3) externally of the gear box 27 with the drive shaft of a hydraulic motor 33. The hydraulic motor 33 is preferably of the axial piston type.

The shaft 26 (FIG. 1) projects at its other end outwardly through the housing 27 and a pair of cams 34, 35 are fixed thereto. The spring loaded plunger 36 (FIG. 3) of a four-way valve 37 engages the periphery of the first cam 34. As shown in FIG. 3, a lever 38 is pivoted to the frame 39 and has a cam follower roller 40 that engages the periphery of the second cam 35. The end of the lever is provided with an adjustable screw 41 which engages the plunger 42 of a deceleration valve 43 fixed on the frame. The four-way valve 37 and the deceleration valve 43 are connected in a hydraulic circuit to provide the desired movement of the shear blades 12, 13, as presently described.

As shown in FIGS. 1, 3 and 4, a housing 44 surrounds the major portion of the path of the shear blades including the rest positions A and B. The housing 44 includes a removable cover 45 held in position by screws 46. The housing has one wall thereof open as at 47' through which the shear blades extend into a position adjacent the feeder 10.

Liquid coolant is applied on the shear blades when they are at the rest positions A and B (FIG. 4) by spraying through nozzles 47, 48. As the shear blades are moved toward the molten stream, air is applied on the shear blades through space nozzles 49, 50 to dry the shear blades.

The mechanism whereby the shear blades are first accelerated, then decelerated, then re-accelerated and stopped is shown diagrammatically in the circuit of FIG. 5. A pilot valve Y-1 is operated in timed relation with a glass forming machine by a suitable timing shaft M at desired intervals to initiate each cycle of the shear blades. As shown, at the start of the cycle, full fluid pressure is being applied through line $L_1$ continuously to the port T of a pilot controlled four-way valve T-1 and the port P of the four-way valve SS-1, which corresponds to the four-way valve 37. Pilot fluid pressure from line $L_2$ is being applied on one end X of the valve T-1. At the desired moment, the valve Y-1 is operated so that the pressure in the pilot line to X on valve T-1 drops off and valve T-1 shifts. This permits flow from port T to port A in valve T-1 starting the fluid motor MF which corresponds to the fluid motor 33 in FIG. 3. Operation of the fluid motor causes rotation of the cam 34 causing the valve SS-1 to be operated and establishing another path of flow to the fluid motor through line $L_4$. Flow control valve F controls the velocity of the blades during the rapid movement toward the stream of molten glass. The pilot valve Y-1 is then operated to shut off flow through the valve T-1 until the start of the next cycle. As the shear blades approach the stream of molten glass, the second cam 35 which is operated by the motor MF operates the deceleration valve V-3, which corresponds to deceleration valve 43 in FIG. 3, to reduce the velocity of the shear blades. The deceleration valve V-3 functions to permit flow only through a controlled needle valve 51 which is part of the deceleration valve V-3. The adjustment of the needle valve 51 provides for the necessary velocity control of the shear blades. After the shear blades have passed through the stream of molten glass, the further operation of the cam 35 releases the deceleration valve V-3 and the speed of the shear blades is increased. As the blades approach the end of their closed path of revolution, the cam 34 permits the valve SS-1 to shift back to closed position positively stopping the shear blades at their initial positions A and B.

The pilot operated four-way valve T-1, the cam operated four-way valve SS-1 and the deceleration valve V-3 are of conventional construction and known in the art.

The timing shaft M may also be used to operate valves Y-2 and Y-3 which control the flow of coolant to the nozzles 47, 48 and drying air to the nozzles 49, 50, respectively, in timed relation to the movement of the shear blades 12, 13.

The positive control achieved due to the use of the hydraulic mechanism permits an accurate reproducible shearing of successive charges so that a better weight control is achieved. By operating the shear blades rapidly toward and away from the cutting position but reducing the velocity of the blades during cutting, the unnecessary violent force on the molten stream and the sheared charge is avoided. At the same time, the rapid action permits successive charges to be severed rapidly as desired under the control of the pilot valve so that the high speed requirements of the glass forming machine can be met. Thus, it is possible with the method and apparatus described to successively sever charges of molten glass at the rate of 60 charges per minute or higher.

We claim:
1. The method of shearing successive charges of glass from a molten stream of glass which comprises
rotating shear blades in opposite directions in paths which intersect the molten stream,
accelerating said shear blades rapidly toward said point of intersection from initial rest positions remote from said point of intersection,
thereafter decelerating while continuing the movement of said shear blades as they approach the point of intersection such that the velocities of the shear blades at the point of intersection are less than the velocity achieved between the initial rest positions and the point of intersection.
continuing to move the blades past the point of intersection at the lesser finite velocities,
thereafter re-accelerating said shear blades to a velocity greater than the velocity of the blades at the point of intersection,
and stopping said shear blades at their initial positions.
2. The method set forth in claim 1 including the steps of subjecting each shear blade to a liquid coolant at its initial rest position and
subjecting each shear blade to a drying action at a point intermediate its initial position and said point of intersection.
3. The method set forth in claim 1 including the steps of spraying a liquid coolant on each shear blade at said initial rest position
and directing a gaseous material at each shear blade along its path of travel between its initial position and the point of intersection to dry the blade.
4. The method of shearing successive charges of glass from a molten stream of glass by using shear blades which are rotatable about a common axis,
which method comprises the steps of:
initially positioning said blades at a rest position approximately 120° away on each side of the point of intersection with said molten stream,
moving each said blade from said rest position through said 120° toward the molten stream,
accelerating each said blade rapidly initially as it is moved from said rest position,
thereafter decelerating while continuing the movement of each said blade as it approaches said point of intersection so that the velocity of the blade at the point of intersection is less than the velocity achieved during the acceleration,
continuing to move the blades past the point of intersection at the lesser finite velocities,
accelerating each said blade after the intersection with the molten stream to a velocity greater than the velocity of the blade through the point of intersection,
and stopping each said blade at its initial position after a single revolution.

References Cited by the Examiner
UNITED STATES PATENTS

| | | | |
|---|---|---|---|
| 2,092,864 | 9/1937 | Wadsworth | 65—133 |
| 2,401,994 | 6/1946 | Weber | 65—334 |
| 2,412,268 | 12/1946 | Honiss | 65—355 |

DONALL H. SYLVESTER, *Primary Examiner.*

D. CRUPAIN, *Assistant Examiner.*